United States Patent [19]
Tornero

[11] 3,988,797
[45] Nov. 2, 1976

[54] TENNIS SHOE OUTSOLE AND METHOD OF MAKING THE SAME

[75] Inventor: Roger Tornero, Naugatuck, Conn.

[73] Assignee: Uniroyal Inc., New York, N.Y.

[22] Filed: Jan. 8, 1975

[21] Appl. No.: 539,368

[52] U.S. Cl. .............................. 12/142 RS; 36/59 R
[51] Int. Cl.² ..................... A43D 9/00; A43B 23/28
[58] Field of Search ..... 36/59 R; 12/142 R, 142 RS, 12/146 R, 146 BR

[56] References Cited
UNITED STATES PATENTS

| | | |
|---|---|---|
| 2,256,863 | 9/1941 | Esterson .......................... 12/146 BR |
| 3,529,370 | 9/1970 | Bernier et al. ...................... 36/59 R |
| 3,577,503 | 5/1971 | Innocenti ....................... 12/142 RS |
| 3,757,437 | 9/1973 | Cameron ............................. 36/59 R |

*Primary Examiner*—Patrick D. Lawson
*Attorney, Agent, or Firm*—Charles A. Blank

[57] ABSTRACT

A tennis shoe outsole, a tennis shoe, the method of making the outsole and the method of making the tennis shoe. The outsole has a preformed abrasion-resistant insert therein in an outer region thereof. The method of making the outsole is by injection molding the outsole adherent to the insert which is held in position in an outsole cavity mold by indexing pins.

2 Claims, 6 Drawing Figures

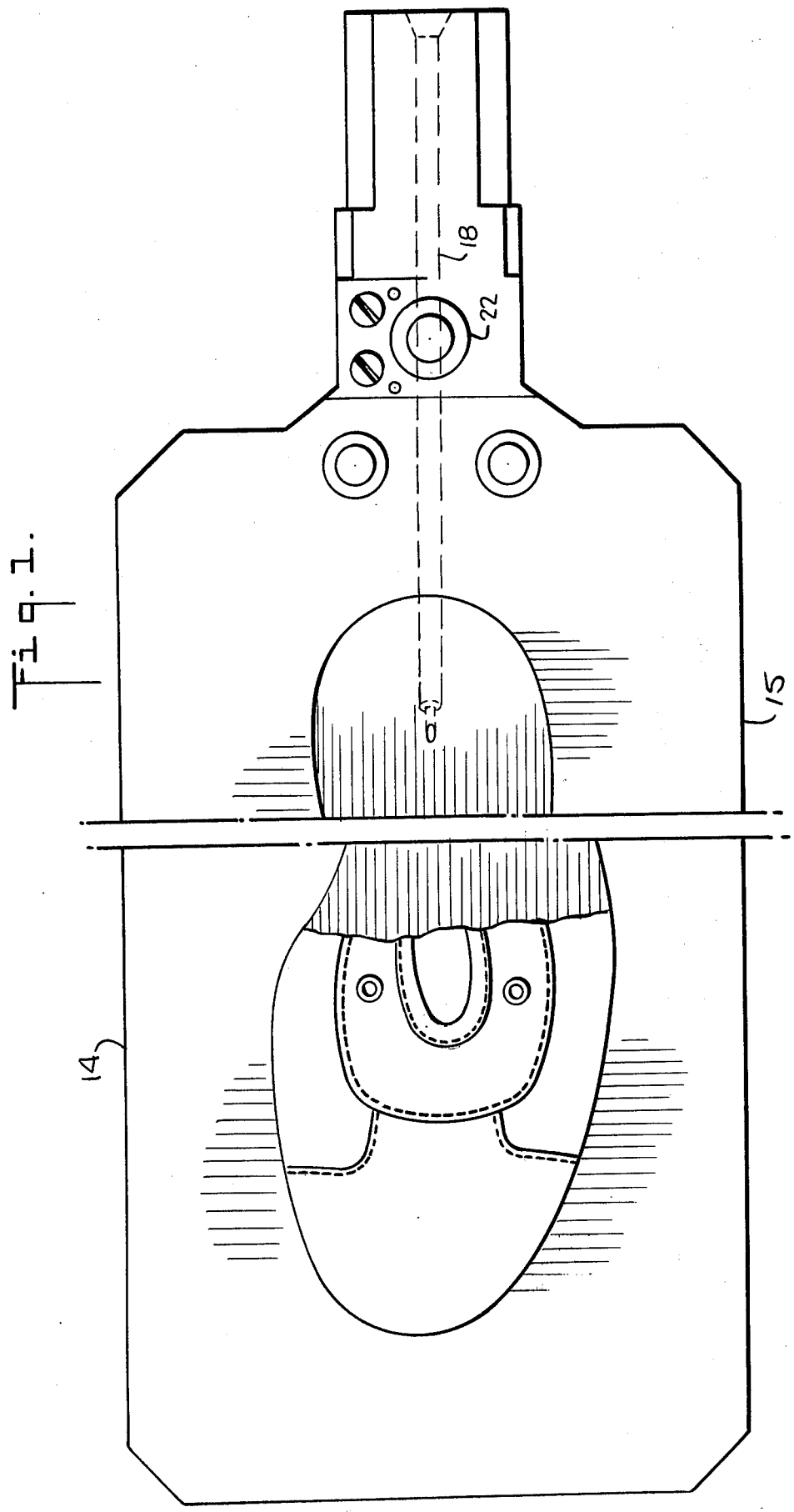

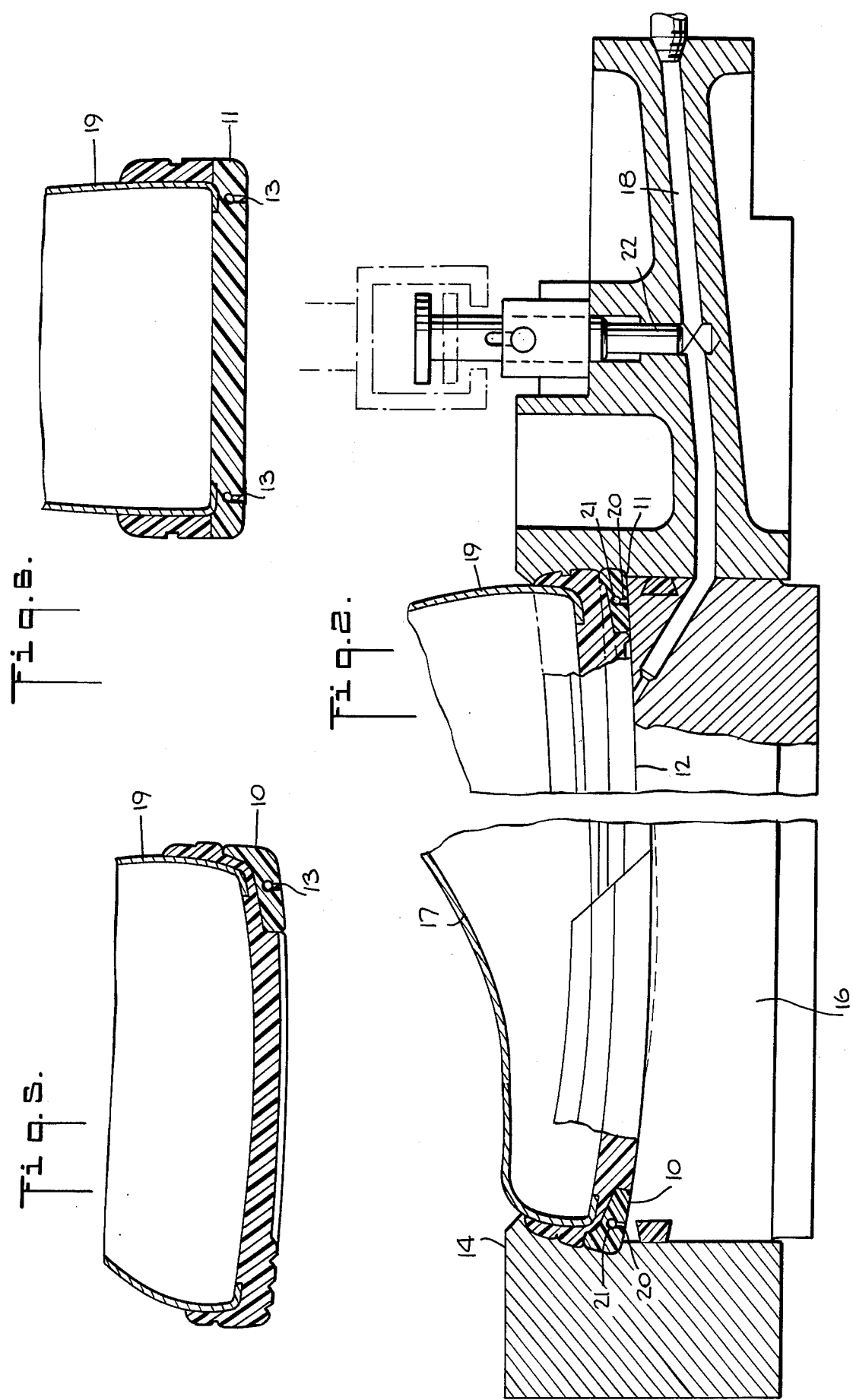

U.S. Patent  Nov. 2, 1976  Sheet 3 of 3  3,988,797
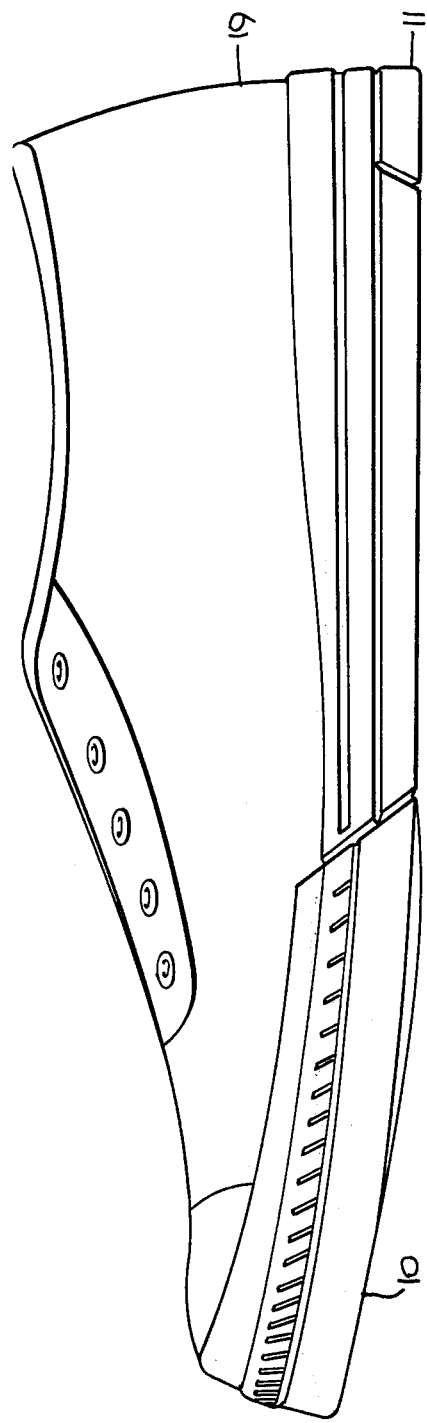
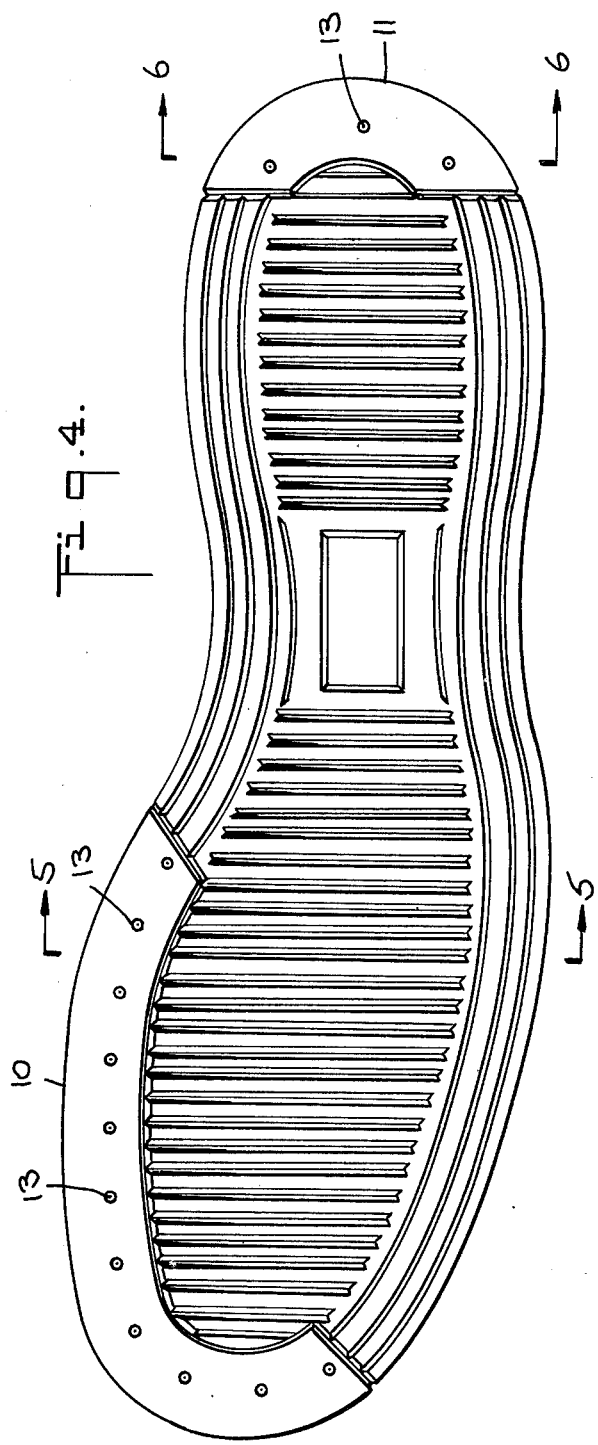

TENNIS SHOE OUTSOLE AND METHOD OF MAKING THE SAME

This invention relates to tennis shoe outsoles, to tennis shoes and to methods of making tennis shoe outsoles and tennis shoes.

Heretofore, tennis shoes worn by professionals and advanced tennis players have had a short life because the shoes become worn through at the edge of the outsole corresponding to a toe region and a ball of the foot region inside the foot and also the shoes are subject to severe wear at the outer edge of the heel region. The shoe upper ordinarily remains in good condition. The life of the shoe is, therefore, shorter than it would be with a better balanced wearing outsole.

There has previously been proposed in U.S. Pat. No. 3,327,334 a method of manufacturing an elastomeric outsole utilizing an insert in a central region of an outsole, which insert is superimposed on a partially cured outsole and is pressed into the outsole, whereupon vulcanization is completed. The insert of U.S. Pat. No. 3,327,334 is of different material from the outsole and may have different properties including greater shelf life, enabling inserts to be stored for substantial periods. The main part of the outsole preferably is less resilient than the insert. Such an outsole is not suitable for use as a tennis shoe outsole because it lacks the flexibility of a tennis shoe outsole and because it is subject to severe wear in the outer regions thereof and does not provide balanced wear on the outsole.

Another method of making a rubber outsole has been proposed in U.S. Pat. No. 2,256,863 by which a partially vulcanized wear plug is assembled in a heel vulcanizing mold in a central region of a heel blank and is then subjected to final vulcanization. The plug may also be positioned in a central region of a half sole. An outsole of this type also is not suitable for use as a tennis shoe outsole for reasons similar to those mentioned previously.

It is an object of the present invention, therefore, to provide a new and improved tennis shoe outsole having better balanced wear.

It is another object of the invention to provide a new and improved tennis shoe having longer wear.

It is another object of the invention to provide a new and improved method of making a tennis shoe outsole.

It is another object of the invention to provide a new and improved method of making a tennis shoe.

In accordance with the invention, the method of making an outsole for a tennis shoe comprises positioning a preformed outsole insert having spaced positioning holes therein on a sole plate of an outsole cavity mold having indexing pins on the sole plate with the indexing pins in corresponding holes of the insert. The method also includes the steps of closing the mold and injection molding an outsole adherent to the insert in the mold.

Also in accordance with the invention, the method of making a tennis shoe comprises positioning a preformed outsole insert having spaced positioning holes therein on a sole plate of an outsole cavity mold having indexing pins on the sole plate with the indexing pins in corresponding holes of the insert. The method also includes placing a shoe upper on a last and disposing the last with the shoe upper thereon in the mold. The method also includes the steps of closing the mold and injection molding an outsole adherent to the insert and to the shoe upper in the mold.

Also in accordance with the invention, an outsole for a tennis shoe comprises an outsole having at least one abrasion-resistant insert adherent thereto in an outer region thereof, subject to severe abrasion during use, the abrasion-resistant insert having more resistance to abrasion than the central region of the outsole to provide longer life for the outsole.

Also in accordance with the invention, a tennis shoe comprises an upper and an outsole adherent to the upper having at least one abrasion-resistant insert adherent to the outsole in an outer region of the outsole subject to severe abrasion during use. The specially designed abrasion-resistant insert has much greater resistance to abrasion than the central region of the outsole in order to provide more uniform wear of the outsole during tennis play.

For a better understanding of the present invention, together with other and further objects thereof, reference is had to the following description, taken in connection with the accompanying drawings, and its scope will be pointed out in the appended claims.

Referring now to the drawings:

FIG. 1 is a fragmentary plan view of an injection mold for use in the method of the present invention;

FIG. 2 is a fragmentary elevational view, partly in section and with one mold ring removed, of the FIG. 1 mold with a shoe last positioned therein and with an outsole represented partly in section;

FIG. 3 is an elevational side view of a tennis shoe manufactured in the accordance with the invention;

FIG. 4 is a bottom plan view of a tennis shoe made in accordance with the invention;

FIG. 5 is a fragmentary sectional view of a tennis shoe manufactured in accordance with the invention, taken along line 5—5 of FIG. 4; and FIG. 6 is a fragmentary sectional view of a tennis shoe made in accordance with the invention, taken along line 6—6 of FIG. 5.

Referring now more particularly to FIGS. 1–6 of the drawings, the method of making an outsole for a tennis shoe comprises positioning a preformed outsole insert having spaced positioning holes therein on a sole plate of an outsole cavity mold having indexing pins thereon with said indexing pins in corresponding holes of said insert. Inserts 10 and 11 are represented in sectional view in FIG. 2 after they have been molded into adherence with an outsole. The insert 10 is disposed at an edge of the outsole 12 corresponding to a toe region and a ball of the foot region along the inside of the foot, as may be more clearly seen in FIG. 3 which represents the outsole 12 in a side elevational view and in FIG. 4 which is a bottom plan view of the outsole 12. The insert 11 is disposed at the rear outer edge of the heel region of the outsole 12, as also represented in FIGS. 3 and 4.

The inserts 10 and 11 preferably are of polyurethane and preferably are preformed and cured in an injection mold of suitable construction. Such an injection mold may have cavities closed by a suitable cover plate to mold the inserts to the desired shape. The cavities of the mold preferably have pins protruding from the base thereof with knobs at the ends of the pins to form holes 13 in the inserts as represented in FIGS. 4, 5, and 6. A dwell time of sufficient length to permit the liquid polyurethane compound injected into the insert mold to cross-link, for example, three to five minutes, is followed by opening the mold, removing the insert, removing flash and cleaning the mold free of any residual material and coating the mold with a suitable release agent in preparation for the next cycle. The injection molding process may be in accordance with well known injection molding methods or alternatively, for example, the inserts may be made by a casting process.

A typical polyurethane recipe for the inserts is as follows:

| Parts | |
|-------|---|
| 100.0 | Polytetramethylene (ether) Glycol at 2000 molecular weight |
| 7.0 | 1,4 Butanediol |
| 2.5 | Trimethylol Propane |
| 0.2 | Stannous Octoate (Catalyst) |
| 62.0 | Polyol/diphenylmethane Diisocyanate Blend at 20 % free isocyanate(prepolymer) |
| 1.0 | Pigment |

The inserts are in the outer region of the outsole and are chemically bonded thereto and are abrasion-resistant and have more resistance to abrasion than the central region and the remainder of the outsole to provide longer life for the outsole and consequently a more balanced wear.

It will be understood that either the toe insert 10 or the heel insert 11 may be omitted in some tennis shoes, in which case the corresponding indexing pins may be omitted on the sole plate and the material for the remainder of the outsole is injected into the space otherwise occupied by the omitted insert.

As represented in FIGS. 1 and 2, an injection mold for a tennis shoe outsole 12 comprises two mold rings 14, 15, a sole plate 16 and a last 17. A runner 18 communicates with the nozzle of injection apparatus (not shown) when the pin 22 is in the raised position represented in FIG. 2 for the injection of the material of the outsole, which preferably is polyurethane, into the mold cavity formed by the mold rings 14, 15, sole plate 16 and last 17 on which an upper 19 has been string-lasted or lasted in any other conventional manner. The upper 19 may be, for example, of leather, fabric or synthetic material.

The sole plate 16 has indexing pins 20 thereon and the pins 20 have knobs 21 at the ends thereof. The pin diameter may be, for example, 1/16 inch, the knob diameter may be, for example, 5/64 inch and the length of the pin including the knob may be, for example, 3/16 inch. The pin 20, including the knob 21 is preferably 0.005 inch to 0.020 inch longer than the corresponding hole in the insert. Accordingly, the method of making the outsole comprises snapping the insert onto the pins 20.

The mold is closed by lowering the last on a support (not shown) to the position represented in FIG. 2, and closing the mold rings 14, 15 to the position represented in FIG. 2. The last 17 is disposed in the mold with the shoe upper 19 thereon, leaving a clearance between the inserts 13 and the upper 19 so that the material injected into the mold to form the remainder of the outsole is chemically bonded to the insert and adherent to the shoe upper in the mold.

The polyurethane recipe for the remainder of the outsole 12 may, for example, be the same recipe as that given for the inserts with the addition of one tenth (0.1) part water to cause the remainder of the outsole other than the inserts to be of expanded polyurethane. A pigment of color different from that of the inserts may be used in the major sole portion.

The polyurethane foam recipe for the major sole portion can be utilized in conventional urethane foam metering, mixing and dispensing equipment, known as liquid injection molding machines, in, for example, a one-shot, prepolymer or quasi-prepolymer system. An example of the one-shot system includes the metering through a gear type pump of a diisocyanate and through another similar pump of a polyol catalyst water blend, the amounts being stoichiometrically determined. From the pumps the metered amounts of each are brought together in a chamber containing a high speed mixer or screw which rapidly blends the ingredients and then forces the material from the chamber into the mold.

In a prepolymer or quasi prepolymer system, a blend of polyol and diisocyanate is substituted for the diisocyanate described in the foregoing paragraph. The blend is prepared such that it contains an excess of isocyanate in a range of 4 to 20 percent over the polyol component. When compatible materials are used for the inserts and the remainder of the outsole, the insert is chemically bonded to the outsole. If dissimilar materials are used, proper chemical treatment of the normally noncompatible materials can result in a chemical bond to accomplish adhesion between the insert and the remainder of the outsole.

The cavity mold for the outsole has previously been lubricated with a suitable polyurethane release agent such as those commonly used in molding polyurethane products from liquid systems. The toe and heel inserts are selected according to the size of the shoe being molded and are placed on the sole plate with the mating pins located on the sole plate indexing into the holes which have been molded in the inserts during the prior insert molding operation. The purpose of the pins is to hold the inserts in position during the injection molding process of the outsole. Otherwise, the flow dynamics of the injected polyurethane liquid compound would disrupt the inserts moving them out of position.

The mold, which has been preheated along with the last to a temperature of approximately 120° to 140° F., is closed around the last to effectively seal the upper on the last into the mold cavity. The liquid polyurethane compound is injected into the mold assembly in a predetermined volume which is set automatically on the injection molding apparatus (not shown). A dwell time of approximately three to five minutes permits the polyurethane compound to cross-link. The mold may then be opened and the shoe may be removed from the last in a conventional manner. The shoe may be cooled for approximately thirty to sixty minutes by being exposed to atmospheric conditions while standing on a shelf. Any flash may then be buffed off the shoe using a wire-wheel in a conventional manner and the shoe may be finished in a conventional manner.

As an alternative method of manufacturing a tennis shoe, the outsole may be manufactured separately and thereafter adhered to the shoe upper in a hand assembly. In such a method, the inserts may be premolded as previously described in connection with the method of making the tennis shoe.

The method of making an outsole for a tennis shoe comprises positioning a preformed insole insert having spaced positioning holes therein on a sole plate of an outsole cavity mold having indexing pins on the sole plate with the indexing pins in corresponding holes of the insert. The cavity molds may be similar to the mold represented in FIGS. 1 and 2. However, the mold is closed by a suitable mating cover plate instead of the last with the upper thereon. The method includes the step of injection molding an outsole adherent to the insert in the mold in a manner similar to that previously described in connection with the manufacture of the tennis shoe. The step of closing the mold comprises closing the mold with a mold-closing member or cover plate, leaving a clearance between the insert and the mold-closing member, and the step of positioning the insert comprises snapping the insert onto the pins on the sole plate, before closing the mold.

The remainder of the molding operation may be accomplished as previously described in connection with the manufacture of the tennis shoe with the difference that the finished article is an outsole rather than a finished article of footwear. Inserts similar to inserts 10 and 11 of the toe and ball of the foot type or the heel type or only one insert can be used.

While there have been described what are at present considered to be the preferred embodiments of this invention, it will be obvious to those skilled in the art that various changes and modifications may be made therein without departing from the invention, and it is therefore, aimed to cover all such changes and modifications as fall within the true spirit and scope of the invention.

I claim:

1. The method of making an outsole for a tennis shoe comprising:
    positioning a preformed outsole insert having spaced positioning holes therein on a sole plate of an outsole cavity mold having indexing pins on said sole plate with said indexing pins in corresponding holes of said insert, said indexing pins having knobs at the ends thereof and said holes of said insert being slightly shorter than said pins, the step of positioning said insert comprising snapping said insert onto said pins;
    closing said mold;
    and injection - molding an outsole adherent to said insert in said mold.

2. The method of making a tennis shoe comprising:
    positioning a preformed outsole insert having spaced positioning holes therein on a sole plate of an outsole cavity mold having indexing pins on said sole plate with said indexing pins in corresponding holes of said insert, said indexing pins having knobs at the ends thereof and said holes of said insert being slightly shorter than said pins, the step of positioning said insert comprising snapping said insert onto said pins;
    placing a shoe upper on a last;
    disposing said last with said shoe upper thereon in said mold;
    closing said mold;
    and injection -molding an outsole adherent to said insert and to said shoe upper in said mold.

* * * * *